No. 657,407. Patented Sept. 4, 1900.
L. P. GIBSON.
FISHING FLOAT.
(Application filed May 29, 1900.)
(No Model.)
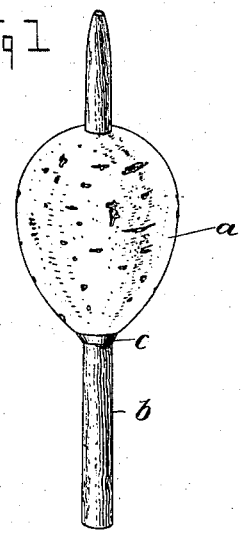
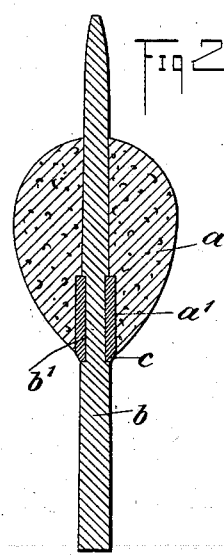
WITNESSES:
INVENTOR
Lorenzo P. Gibson.
BY
ATTORNEYS

UNITED STATES PATENT OFFICE.

LORENZO P. GIBSON, OF LITTLE ROCK, ARKANSAS.

FISHING-FLOAT.

SPECIFICATION forming part of Letters Patent No. 657,407, dated September 4, 1900.

Application filed May 29, 1900. Serial No. 18,408. (No model.)

*To all whom it may concern:*

Be it known that I, LORENZO P. GIBSON, a citizen of the United States, and a resident of Little Rock, in the county of Pulaski and State of Arkansas, have invented a new and Improved Fishing-Float, of which the following is a full, clear, and exact description.

The purpose of this invention is to provide a fishing-float which will effectively maintain an upright position in the water without dependence upon the tug of the line at the lower end of the float, by which arrangement I am enabled to leave the lower portion of the line entirely free, without a sinker of any sort, if such arrangement be desired, and yet maintain the float in a vertical position, in which position it operates best, as is understood.

This specification is the disclosure of one form of the invention, while the claim defines the actual scope thereof.

Reference is to be had to the accompanying drawings, forming a part of this specification, in which similar characters of reference indicate corresponding parts in both views.

Figure 1 is a perspective view of the invention, and Fig. 2 is a longitudinal section of the same.

The device comprises the usual cork or float $a$, through which is passed a stem $b$, preferably formed of hard wood and projecting above and below the cork or float. Formed on the stem $b$ at the lower portion of the cork is a reduced portion $b'$, which extends entirely around the stem and in which reduced portion is secured a sleeve or ferrule $c$, of lead or other metal. The sleeve or ferrule $c$ is preferably formed of a sheet tubulated or rolled around the reduced portion $b'$ of the stem $b$. For the reception of the tube or sleeve $c$ the cork $a$ is formed with an enlarged portion $a'$ in the opening of the cork, into which opening the sleeve and stem $b$ are fitted. The sleeve $c$ is almost entirely held in the cork $a$ and is concealed thereby, only the lower extremity of the sleeve being visible, Fig. 1. This construction provides a strong and durable device the cost of which is not materially increased over previous constructions of its class and which will, as explained, maintain the float upright without necessitating weighting the line below the float.

Having thus described my invention, I claim as new and desire to secure by Letters Patent—

A fishing-float, having a body portion or float proper formed with a passage extending vertically therethrough, a stem fitted in the passage and projecting above and below the body, the stem being formed with a reduced portion at the lower part of the body, and a metallic sleeve or ferrule fitted around the reduced portion of the stem and having its major portion contained within the body of the boat, for the purpose specified.

In witness whereof I have signed my name to this specification in the presence of two subscribing witnesses.

LORENZO P. GIBSON.

Witnesses:
CLAUDE H. SAYLE,
D. J. ROGERS.